United States Patent [19]

Hatfield

[11] Patent Number: 4,526,497
[45] Date of Patent: Jul. 2, 1985

[54] AUTOMATIC JAW CONTROL FOR REVERSIBLE POWER TOOL

[76] Inventor: Jim J. Hatfield, 2723 Spreckles La., Redondo Beach, Calif. 90278

[21] Appl. No.: 358,030

[22] Filed: Mar. 15, 1982

[51] Int. Cl.³ .............................................. B23B 31/24
[52] U.S. Cl. ................................... 408/240; 279/1 K; 279/60
[58] Field of Search ............................ 279/1 K, 60–65, 279/1 B, 58, 56; 408/241 R, 240, 238

[56] References Cited

U.S. PATENT DOCUMENTS

| 3,237,955 | 3/1966 | McCarthy | 279/63 |
| 3,506,277 | 4/1970 | Harms | 279/63 |
| 3,545,776 | 12/1970 | Haviland | 279/63 |
| 4,274,642 | 6/1981 | Wünsch | 279/60 |
| 4,277,074 | 7/1982 | Kilberis | 279/60 |
| 4,323,324 | 4/1982 | Eberhardt | 279/1 K |
| 4,395,170 | 7/1983 | Clarey | 279/1 K |

*Primary Examiner*—William R. Briggs
*Attorney, Agent, or Firm*—Charles H. Thomas

[57] ABSTRACT

A reversible drill, equipped with a chuck having a jaw guide, chuck jaws constrained by the jaw guide for radial advancement and retraction, and chuck jaw propulsion means for driving the chuck jaws in advancement and retraction, is equipped with a manually actuable clutch for easing the chuck jaw propulsion means into and out of engagement with the drill housing to, respectively, prevent and allow relative rotation between the jaw guide and the chuck jaw propulsion means. When the drill motor is driven in one direction of rotation, the chuck jaw propulsion means is immobilized relative to the drill housing and the chuck jaws are advanced radially toward each other to grip a drill bit. When the housing and chuck jaw propulsion means are eased together and the drill motor is driven in the opposite direction, the chuck jaw propulsion means is immobilized and draws the chuck jaws apart as the jaw guide rotates to release a drill bit. When the chuck jaw propulsion means is disengaged from the drill housing the drill is operable in a normal manner. An O-ring is positioned between the drill housing and the chuck jaw propulsion means and is operable independently of the clutch mechanism to exert a light drag on the chuck jaw propulsion means. Drill bits can be lightly seized and chuck jaws opened without engagement of the clutch mechanism.

6 Claims, 12 Drawing Figures

AUTOMATIC JAW CONTROL FOR REVERSIBLE POWER TOOL

BACKGROUND OF THE INVENTION

1. Field of the Invention

The present invention relates to keyless chuck tightening and releasing mechanisms used in reversible electric drills and other reversible power tools which receive interchangeable work pieces.

2. Description of the Prior Art

Reversible power tools are currently used for many purposes throughout a wide variety of industries and in homes and businesses everywhere. One such implement which is widely used and which is found in many workshops is a portable, hand held reversible electric drill. Reversible electric drills typically have pistol shaped housings which may be held in one hand and operated by depression of a trigger. Within the housing there is an electric motor coupled in series with a switch operated by the trigger. The armature of the motor is geared to a drive shaft which protrudes from the nose of the pistol shaped housing. A drill chuck is fastened to the drill drive shaft.

The purpose of a drill chuck is to allow a user to selectively grip and release a variety of work pieces or drill bits. Such work pieces and drill bits have bases or stub axles which extend into a cavity in the drill chuck axially aligned with the drive shaft. A drill chuck includes a plurality of chuck jaws which may be radially advanced and retracted to grip a work piece or drill bit positioned in the chuck cavity. The chuck jaws are normally aligned at an angle relative to the drill drive shaft and are advanced both radially and axially relative to the drill drive shaft by means of a chuck jaw propulsion system.

The chuck jaw propulsion system is mounted for rotation relative to the chuck jaw guide and includes a threaded ring which interacts with corresponding threads on the chuck jaws to advance and retract the chuck jaws relative to the extended axis of rotation of the drill drive shaft.

During normal operation of the drill the chuck jaw propulsion or reciprocating mechanism and the jaw guide move together. That is, when power is applied to the drill the chuck jaw reciprocating mechanism and the jaw guide rotate together. If the chuck jaws grip a drill bit and power is applied to the drill, a relatively light axial force on the butt of the drill housing will provide the necessary pressure to allow the drill bit to bite into and bore a hole in an object to be drilled. The chuck jaws must grip the base of the drill bit tightly enough so that the resistance of the article to be drilled does not halt rotation of the drill bit and allow the chuck to rotate around the drill bit without turning the bit.

Conventional electric drills employ a key arrangement in order to tighten the chuck jaws sufficiently to firmly grip the drill bit in the chuck. Essentially the same chuck key tightening system has been used for many years on both reversible and unidirectional drills. According to this conventional chuck key tightening system the end of the chuck jaw propulsion structure is canted at an angle and is equipped with bevel gearing adjacent to the chuck jaw guide which it surrounds. The chuck jaw guide is equipped with blind radial wells oriented perpendicular to the axis of rotation of the drill drive shaft. A small chuck key has a stub axle extending from bevel gearing and includes a lever arm oriented radially outwardly from the axis of rotation of the bevel gearing. The stub axle of the chuck key is inserted into one of the blind wells in the chuck jaw guide, thereby bringing the bevel gearing of the chuck key and the corresponding bevel gearing on the chuck jaw propulsion structure into mating engagement. The chuck key extends perpendicular relative to the axis of rotation of the drill shaft when engaged with the chuck jaw guide and the chuck jaw propulsion system.

The chuck key can be rotated in a selection direction, thereby rotating the chuck propulsion structure about the axis of rotation of the drive shaft while preventing rotation of the chuck jaw guide. Rotation of the chuck jaw propulsion system and the relative immobilization of the chuck jaw guide will result in the chuck jaws advancing or retracting, depending upon the direction of rotation of the chuck jaw propulsion structure. A drill bit inserted between the chuck jaws can thereby be selectively gripped or released.

The chuck key is necessary both in the operation of removing a drill bit and in securement of another drill bit in the drill. However, the chuck key must be removed from engagement with the jaw guide and chuck jaw propulsion structure during drilling operations. If the chuck key is not removed, the drill can be seriously damaged and the user or observers are subjected to a considerable likelihood of injury by the chuck key.

The detachable nature of a conventional chuck key represents a serious disadvantage in the use of a drill. Chuck keys frequently become separated from the drill and misplaced. The absence of a chuck key is a constant source of irritation and frustration to users of a drill. While various types of leashes and chuck key constraining systems have been utilized to attempt to solve this problem, all previous devices of this type have proven unsatisfactory. Flexible chuck leashes frequently break and the drill key becomes separated from the drill. Rigid chuck key constraints also tend to malfunction and have the further disadvantage that engagement of the chuck key with both the chuck jaw guide and chuck jaw propulsion structure is not as readily apparent. Accordingly, the likelihood that the chuck key may be inadvertently left engaged so that damage or serious injury can occur is increased.

Some attempts have been made to devise systems which dispense with the requirement for a chuck key. For example, U.S. Pat. No. 2,716,555 discloses a system which utilizes the power of a reversible drill to tighten and loosen the chuck jaws without a chuck key. This system employs a slide which is directed radially toward the drive shaft of a drill and which is normally biased away from the drill drive shaft. The chuck jaw propulsion system is equipped with stop lugs extending radially outwardly within the drill housing. Depression of the slide against the radially outwardly spring bias operates the slide as a plunger to interfere with the radially extending stop lugs of the chuck jaw propulsion structure to immobilize that structure relative to the drill housing. With the chuck jaw propulsion structure immobilized, operation of the drill motor will turn the drill drive shaft, thereby rotating the chuck jaw guide as well. Depending upon the direction of rotation, the chuck jaws will be advanced or retracted to grip or release a drill bit located there between.

One problem with the system disclosed in U.S. Pat. No. 2,716,555 is that there is no mechanism for gradually immobilizing the chuck jaw propulsion system from rotation relative to the drill housing. The stop lugs always react with the slide to produce a sharp impact, thereby tending to damage the drill. Furthermore, there is no provision for automatically tightening and loosening the drill chuck jaws. The system must always be manually initiated. A further problem is that there is no provision for preventing overtightening of the chuck jaws on a drill bit. Because the force tending to tighten the chuck jaws upon the base of a drill bit is derived from the operation of the electric motor itself, the tightening force is very great. The chuck jaws can easily be driven so tightly about a drill bit that they cannot be loosened. While U.S. Pat. No. 2,716,555 does provide a clutch mechanism to disengage the drill drive shaft from the drive motor, no provision is made to allow release of a drill bit upon which the chuck jaws have been overtightened.

SUMMARY OF THE INVENTION

The present invention is an improvement in a reversible drill or other power tool for receiving interchangeable work pieces. One aspect of the present invention provides a system for automatically advancing and retracting drill chuck jaws until resistance is encountered merely by actuation of the power tool motor. No separate manual actuation of any chuck tightening or loosening mechanism is required. Rather, a motion retarding means, such as a rubber O-ring, is positioned between the power tool housing and the chuck jaw propelling means to exert a light drag on the rotation of the chuck jaw propelling means. Insertion of a drill bit into the drill chuck with the jaws initially open and operation of the drill motor in one direction will automatically advance the chuck jaws to lightly grip the drill bit without any manual operation other than actuation of the drill motor trigger. This allows a user to initiate securement of a drill bit in a chuck without danger of injuries. In conventional practice a user is likely to manually grasp the chuck jaw propulsion barrel while operating the drill in order to achieve the same effect. However, the hand of the user tending to exert a drag on a rotating chuck propulsion barrel can easily be injured if the user is inexperienced or inattentive. By employing the motion retarding mechanism of the invention this hazzard is eliminated entirely. By the same token, operation of the drill in the opposite direction when there is no drill bit within the chuck jaws will cause the chuck jaws to retract so as to be able to accept a drill bit having a large diameter. In either event separate manual actuation of a mechanism to initially immobilize a drill bit within chuck jaws or to open the chuck jaws is unnecessary.

The present invention also provides a reversible drill with a clutch mechanism that has a clutch actuator, a clutch interface and coupling means for moving the clutch interface into engagement at a mechanical advantage in response to movement of the clutch actuator. That is, manual movement of the clutch actuator over a given distance will produce movement of only a fraction of that distance in the clutch interface mechanism. This allows the clutch interface mechanism, for example facing blocking teeth, to be gradually eased together so that the chuck jaw propulsion barrel is not suddenly locked to the drill housing with a sudden impact, as in prior art devices. The elimination of such impact in the clutch interface mechanism significantly prolongs the useful life of the drill.

Another feature of the invention is that the clutch mechanism has a torque limiting capability greater in one direction of drill motor rotation than in the other. That is, the clutch mechanism is equipped with biasing means which will be overcome should too great a torque exist between the chuck propulsion barrel and the chuck guide. This prevents internal damage to the drill mechanism since otherwise the chuck jaws could be advanced to squeeze the drill bit until stress failure in the drill mechanism occurred. By employing a torque limiting mechanism, an upper limit is reached beyond which the clutch will be automatically disengaged and the jaws will be tightened no further upon the drill bit. However, and unlike prior systems, the torque limiting mechanism of the present invention provides a slightly higher upper torque limit when the drill motor is rotated to retract the chuck jaws than when it is operated in the opposite direction to tighten the chuck jaws. This prevents the chuck jaws from seizing a drill bit with such great force that it cannot be released.

In tightening chuck jaws onto a drill bit the jaws will sometimes bind onto the drill bit. The metal may ring together so that a greater force is required to loosen the chuck jaws from the drill bit than was exerted to grasp the drill bit. With manual chuck key arrangements the solution to this dilemma is to exert a greater force manually to loosen the drill bit than is used to tighten it. However, in prior automatic chuck jaw tightening systems there is no differentiation in the torque limit for grasping and releasing a work piece. Consequently, such prior systems, like that disclosed in U.S. Pat. No. 2,716,555, provided no means by which an overtightened drill bit could be removed. It is now possible to remove an overtightened drill bit with the automatic drill bit engaging and releasing system of the present invention.

The invention may be described with greater clarity and particularity by reference to the accompanying drawings.

DESCRIPTION OF THE EMBODIMENTS

Figures 1, 3, 4, 5:
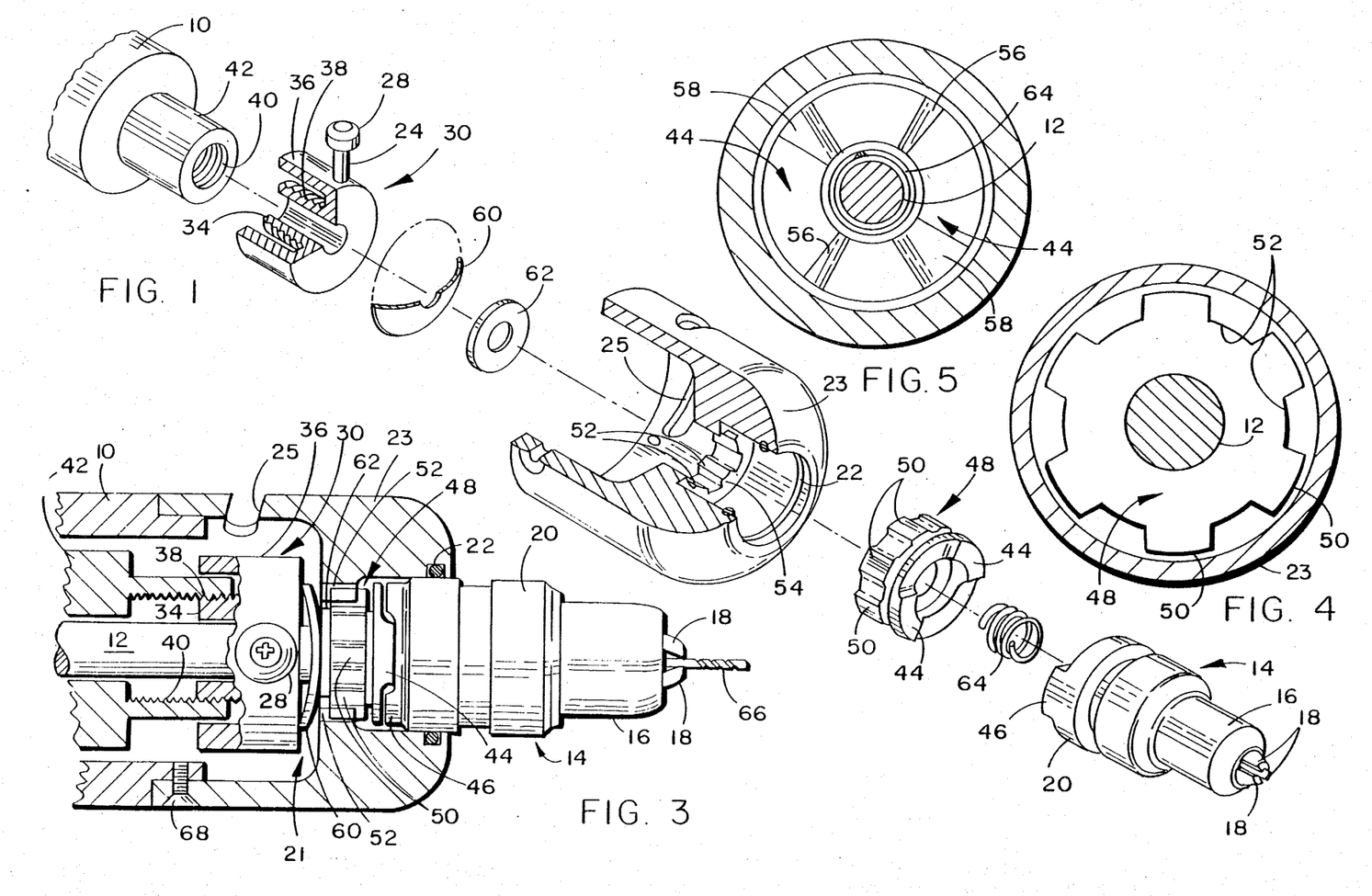
FIG. 1 is an exploded perspective view of one embodiment of an improved clutch mechanism in an electric drill according to the invention.
FIG. 3 is a side sectional elevational view of the embodiment of FIG. 1 showing the clutch interface mechanism engaged.
FIG. 4 is a tranverse sectional view taken along the lines 4—4 of FIG. 2.
FIG. 5 is a transverse sectional view taken along the lines 5—5 of FIG. 2.
Figure 2:
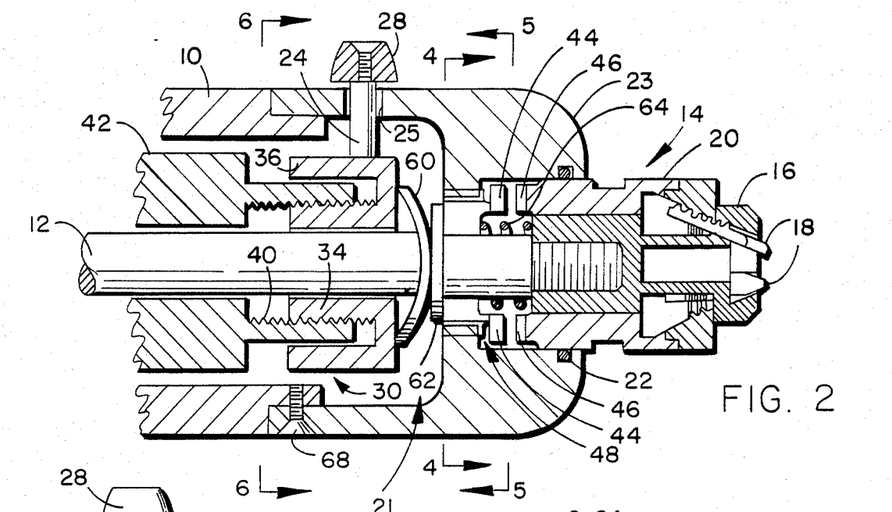
FIG. 2 is an elevational sectional view taken along the drill drive shaft axis of the embodiment of FIG. 1 showing the clutch interface mechanism thereof disengaged.

In FIGS. 1, 2 and 3 the nose of the housing 10 of a reversible drill is visible. The reversible drill has a rotary drive shaft 12, visible in FIGS. 2 and 3, carried by the drill housing 10. The projecting extremity of the drill drive shaft 12 is threaded, and a chuck 14 is threadably engaged therewith for rotation with the drive shaft 12. As illustrated in FIG. 2, the chuck 14 has a generally mushroom shaped jaw guide 16, three bar like jaws 18 arranged at equal intervals around the opening in the front of the chuck guide 16 and disposed in inclined orientation relative to the extension of the axis of rotation of the drive shaft 12, and an annular, barrel shaped chuck jaw propelling or reciprocating mechanism 20 for advancing and retracting the chuck jaws 18.

One very significant aspect of the invention is the clutch mechanism 21 for the reversible drill. The clutch mechanism 21 operates to ease the chuck jaw reciprocating or propelling mechanism 20 into and out of engagement relative to the drill housing 10. When the chuck jaw propelling mechanism 20 is gradually drawn into engagement with structure secured to the drill housing 10, it is restrained from rotation relative to the drill housing. Since the chuck jaw propelling mechanism 20 is then locked or restrained from rotating relative to the drill housing 10, activation of the drill motor and the drive shaft 12 will rotate the jaw guide 16 but not the chuck jaw propelling mechanism 20. Depending upon the direction of rotation of the drive shaft 12 the jaws 18 will be advanced or retracted. When the chuck jaw propelling mechanism 20 and the housing 10 are gradually drawn or eased apart, the chuck jaw propelling mechanism 20 is released and is free to rotate with the chuck jaw guide 16. Both the chuck jaw propelling mechanism 20 and the jaw guide 16 can then be driven in rotation by the drive shaft 12 upon actuation of the drill motor and there is no relative rotation therebetween, except that which may be caused by the motion retarding O-ring 22.

The O-ring 22 represents another very important aspect of the invention. The O-ring 22 is a conventional rubber O-ring, formed in a toroidal configuration and mounted within a transverse channel surrounding the central, axial opening in a cup shaped drill housing nose extension 23. The O-ring 22 exerts a light drag tending to retard rotation of the chuck jaw propelling mechanism 20 relative to the drill housing 10. This allows the chuck jaws 18 to be opened or closed upon rotation of the drive shaft 12, unless the clutch mechanism 21 has been used to tighten the chuck jaws 18 on a drill bit or other work piece.

The clutch mechanism 21 includes a clutch actuator which has a radial lever arm 24 that protrudes through a spiral slot 25 formed in the drill housing nose extension 23. The protruding extremity of the lever arm 24 has attached thereto a plastic knob 28 which the drill user can manually manipulate. The inner extremity of the lever arm 24 terminates in an annular clutch coupling mechanism including a bearing collar 30 depicted in FIGS. 1, 2, 3 and 6. The bearing collar 30 has an interior, annular, tube like track follower 34 about which a surrounding, annular sleeve 36 is coaxially mounted a spaced distance therefrom. The radially outer surface of the track follower 34 is formed with six male, spiral threads 38 thereon, illustrated in FIG. 6.

Figure 6:
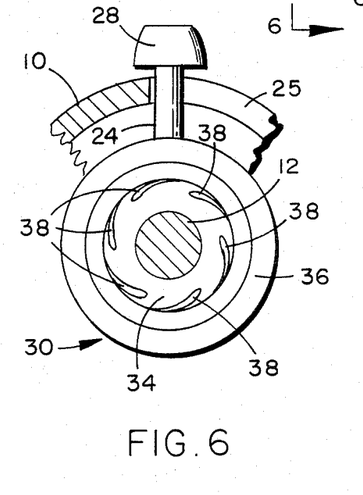
FIG. 6 is a transverse sectional view taken along the lines 6—6 of FIG. 2.

The threads 38 are in mesh with corresponding female threads 40 on the annular nose extension collar 42 which is securely attached to the drill housing 10.

The clutch mechanism 21 also includes first and second sets of opposing teeth 44 and 46, respectively, which form a clutch interface mechanism. Both of the sets of teeth 44 and 46 are disposed about a common axis, and in the embodiment of FIGS. 1-6, both sets of teeth 44 and 46 are disposed coaxially about the drive shaft 12 in facing relationship.

The first set of teeth 44 is visible in FIGS. 1, 2 and 5. The teeth 44 are axially directed toward the chuck jaw propelling mechanism 20 and are formed upon an annular, axially reciprocal, impact tooth carrier 48. The impact carrier 48 has radial crenelations 50 formed upon its outer surface. The crenelations 50 mate with corresponding crenelations 52 which define an axial opening in a transverse partition 54 within the drill housing nose extension 23, as illustrated in FIGS. 1 and 4. The purpose of the interengageable crenelations 50 and 52 is to form a means for immobilizing the first set of teeth 44 from rotation relative to the drill housing 10 which will allow axial, reciprocal movement of the impact tooth carrier 48. The impact tooth carrier 48 serves as a longitudinally reciprocal means for bringing the first set of teeth 44 and the second set of teeth 46 into and out of mutual engagement.

The teeth 46 in the second set are formed on the rearwardly facing surface of the barrel shaped, annular, chuck jaw propelling mechanism 20. The structure of the body of the chuck jaw propelling mechanism 20 serves as a means for coupling the second set of teeth 46 to move with the chuck jaw propelling or reciprocating mechanism 20.

The opposing teeth 44 and 46 have first bearing surfaces 56 which are engageable with each other. The bearing surfaces 56 of the teeth 44 are visible in FIGS. 1 and 5. The bearing surfaces 56 are engaged upon rotation of the drive shaft 12 in one direction to retract the chuck jaws 18. The teeth 44 and 46 also have a second set of bearing surfaces 58 engageable with each other upon rotation of the drive shaft 12 in the opposite direction to advance the chuck jaws.

The first bearing surfaces 56 are oriented to engage each other more nearly perpendicularly than the second bearing surfaces 58. As a consequence, when torque between the first and second sets of teeth 44 and 46 builds in the direction advancing the chuck jaws, the second set of bearing surfaces 58 will be interengaged. The second set of bearing surfaces 58 will slip past each other more readily than will the first set of bearing surfaces 56 when the drive shaft 12 rotates in the opposite direction to retract the chuck jaws 18. This difference in tooth bearing surface configuration serves to prevent overtightening. That is, the chuck jaws 18 can be advanced toward each other and can grip a drill bit with only a limited amount of force before the bearing surfaces 58 begin to slip past each other. On the other hand, the upper limit of torque tending to dislodge the chuck jaws 18 from gripping relationship upon a drill bit inserted there between is greater. When the drive shaft 12 is rotated in the opposite direction to attempt to dislodge the chuck jaws 18 from a drill bit, the bearing surfaces 56 will not slip past each other so readily. The upper limit of torque in retracting the chuck jaws 18 therefore is greater than the upper limit of torque for advancing the chuck jaws 18.

The chuck mechanism 21 also includes an annular torque limiting curved steel spring washer 60 disposed about the drive shaft 12 immediately forward from the bearing collar 30. A nylon spacer washer 62 is located between the spring washer 60 and the impact tooth carrier 48. The spring washer 60 serves as a torque limiting means interposed between the clutch actuating lever 24 and the first set of teeth 44.

As the clutch actuating lever 24 is rotated in the spiral slot 25 in the drill housing nose extension 23, it will rotate the bearing collar 30 about the drive shaft 12 upon which the bearing collar 30 is coaxially disposed. The bearing collar 30 rides on a spiral track, formed by the interengaged spiral threads 38 and 40 on the tubular track follower 34 and nose extension collar 42, respectively.

A coil spring 64 is disposed coaxially about the drive shaft 12 and acts to bias the first and second sets of teeth 44 and 46, respectively, apart. The coil spring 64 thereby urges the first set of teeth 44 rearward, and the impact tooth carrier 48 drives the bearing collar 30 toward the end of the spiral tract remote from the chuck jaw propelling mechanism 20. This tends to rotate the clutch actuating lever arm 24 counterclockwise to the position depicted in FIGS. 2 and 6.

When the clutch actuating lever arm 24 is rotated clockwise, as viewed in FIG. 6, it rotates the bearing collar 30, by means of its coupling thereto, and advances the bearing collar 30 toward the opposite end of the spiral track, the end closest to the chuck jaw propelling mechanism 20. As the bearing collar 30 advances by manual manipulation of the lever arm 24, it overcomes the force of the biasing spring 64. Complete rotation of the lever arm 24 throughout the length of the slot 25 compresses the biasing spring 64, overcoming its force, and forces the first and second sets of teeth 44 and 46 into mutual engagement, as depicted in FIG. 3. With the teeth 44 and 46 engaged, the chuck jaws 18 will be advanced or retracted, depending upon the direction of rotation of the drive shaft 12, until resistance is encountered.

As resistance to advancement or retraction of the chuck jaws 18 increases, torque builds in the clutch mechanism 21. Ultimately, the torque developed in the clutch mechanism 21 will be sufficient to overcome the spring force of the spring washer 60. As a result, the spring washer 60 will be compressed sufficiently to allow the teeth 44 and 46 to slip past each other.

Because the angle of interface between the bearing surfaces 58 is less than the angle of interface between the bearing surfaces 56, the frictional force of engagement of the bearing surfaces 58 is less than the corresponding frictional force of engagement of the bearing surfaces 56 for any given degree of compression of the spring washer 60. As a consequence, compression of the spring washer 60 to a degree sufficient to allow the bearing surfaces 58 to slip relative to each other when the drill shaft 12 is rotated to advance the jaws 18 is insufficient compression to allow the bearing surfaces 56 to slip past each other when the drill of shaft 12 is rotated in the opposite direction to retract the jaws 18. The structure thereby prevents overtightening by allowing the jaws 18 to be retracted with a torque in the clutch mechanism 21 greater than the torque allowed to tighten the jaws 18.

The internal construction of the chuck mechanism 14 is that of a conventional 3-jaw chuck. The jaws 18 are slab like or bar like structures and have helical thread sections defined on the rear portions of their outwardly facing surfaces. Each of the jaws 18 is constrained to move in both axial and radial advancement and retraction relative to the axis of the drive shaft 12 to grip and release a drill bit, such as the drill bit 66 illustrated in FIG. 3. The chuck jaws 18 are each constrained to move reciprocally within separate passageways extending through the head of the jaw guide 16 at angles inclined to the axis of the drive shaft 12. Behind the head of the jaw guide 16 the rearward ends of the jaws 18 reside in a cavity defined between the neck of the jaw guide 16 and the barrel shaped chuck jaw reciprocating or propelling mechanism 20. Female threads at the forward extremity of the chuck jaw propelling mechanism 20 engage the thread sections on the jaws 18, so that relative rotation between the chuck jaws 18 and the chuck jaw propelling mechanism 20 will advance or retract the jaws 18, depending upon the direction of relative rotation. The base of the jaw guide 16 is threadably secured to the drive shaft 12, and the jaw guide 16 moves or remains at rest with the drive shaft 12. The chuck jaw propelling mechanism 20 is journalled relative to the jaw guide 16.

While the internal structure of the chuck mechanism 14 is quite conventional, the external structure thereof is not. From FIGS. 1 and 2 it should be noted that the conventional beveled gearing on the forward face of the chuck jaw propelling mechanism 20 is absent. Likewise, the conventional radial chuck key locating wells in the jaw guide 16 are likewise absent. Unlike a conventional chuck mechanism, the chuck mechanism 14 includes rearwardly extending blocking or impact teeth 46, which form part of the clutch mechanism 21.

As in conventional chuck mechanisms, a portion of the chuck jaw propelling or propulsion mechanism 20 is mounted for rotation relative to the housing 10 and within the drill housing nose extension 23. Unlike conventional devices, a motion retarding, resilient rubber O-ring 22 resides in an annular channel encircling the axis of rotation of the chuck jaw propelling mechanism 20 within the structure of the drill housing nose extension 23. The O-ring 22 resides in contact with both the drill housing nose extension 23 and the chuck jaw propelling mechanism 20 to exert a light drag therebetween.

The novel structure of the embodiment of FIG. 1 is assembled on an otherwise conventional reversible drill housing 10 in the manner depicted in FIG. 1. That is, the spiral teeth 38 of the tubular track follower 34 are engaged with the corresponding female spiral teeth 40 on the nose extension collar 42. The bearing collar 30 is thereupon spun onto the nose extension collar 42 with the drive shaft 12 (not shown for clarity of illustration in FIG. 1) extending through a central axial bore in the bearing collar 30.

The spring washer 60 and the spacer washer 62 are then disposed axially about the drive shaft 12. The drill housing nose extension 23 is then maneuvered into position and secured to the drill housing 10 by screws 68, depicted in FIGS. 2 and 3. The lever arm 24 may be threadably engaged in a radial bore in the outer surface of the sleeve 36 of the bearing collar 30, or it may be welded thereto. If the lever arm 24 is welded to the bearing collar 30 the drill housing nose extension 23 and the bearing collar 30 must be maneuvered together to manipulate the lever arm 22 through the spiral slot 25 with the manual actuation knob 28 removed.

Once the drill housing nose extension 23 has been secured to the drill housing 10 with the screws 68, the impact tooth carrier 48 is inserted through the central axial opening in the drill housing nose extension 23 until the crenelations 50 and 52 are mutually engaged. The coil spring 64 is then slipped over the protruding end of the drill shaft 12 and the chuck mechanism 14 is engaged with the drill shaft 12 by threadably engaging the extremity of the drill shaft 12 with the accommodating tapped, axial well in the base of the chuck guide 16. The improved, reversible drill of the invention is thereupon ready for operation.

With no drill bit between the jaws 18 operation of the drill motor will result in advancement or retraction of the jaws 18. This occurs due to the drag exerted on the chuck jaw propelling mechanism 20 by the rubber O-ring 22. Without any manual operation other than selection of the direction of rotation and actuation of the drill motor trigger switch the jaws 18 can be advanced or retracted. In this manner the jaws 18 can be closed to grip a drill bit manually held therebetween. In some applications, especially for drill bits of very small diameter, the grip thereby exerted by the retardation of rotation of the chuck jaw propelling mechanism 20 by the O-ring 22 is all that is necessary. The retardation of rotation of the jaw propelling mechanism 20 creates relative rotation between the jaw propelling mechanism 20 and the jaw guide 16. That is, the jaw guide 16 rotates faster than the jaw propelling mechanism 20. The empty jaws 18 can also be opened in a corresponding fashion to accept a larger diameter drill bit.

In many instances a greater force of gripping and jaw dislodgment is required. This force is achieved with the improved clutch mechanism 21 of the invention. To retract the jaws 18 from a drill bit gripped there between, the drill user pushes the actuator knob 28 and advances the lever arm 24 clockwise as viewed in FIG. 6. This rotates the bearing collar 30, carrying it on the spiral track defined by the threads 38 and 40 toward the end of the track closest to the chuck mechanism 14. Actuation of the lever arm 24 in this fashion overcomes the bias of the coil spring 64, which is compressed as the bearing collar 30 is advanced. With the pressure from the bearing collar 30 acting through the spring washer 60 and the spacer washer 62, the impact tooth carrier 48 is driven forward until the teeth 44 thereon are engaged with the teeth 46 on the chuck mechanism 14. Selection of a direction of drill rotation in one direction, and actuation of the drill motor trigger switch will cause the drive shaft 12 to rotate the chuck guide 16. Since the crenelations 50 and 52 immobilize the impact tooth carrier 48, and since the teeth 44 and 46 are thereupon engaged, as depicted in FIG. 3, the chuck jaw propelling mechanism 20 is immobilized from rotation relative to the drill housing 10. The jaws 18 are carried in rotation within their constraining passageways with the jaw guide 16, so that the jaws 18 are propelled toward the rear of the cavity between the neck of the jaw guide and the chuck jaw propelling mechanism 20.

To grip a drill bit, the lever arm 24 is held in the same clockwise position in the slot 25, overcoming the bias of the coil spring 64 as depicted in FIG. 3. The rotational direction selector on the drill is reversed, and the trigger switch for the drill motor is again depressed. This causes the drive shaft 12 to rotate in the opposite direction although the chuck jaw propelling mechanism 20 is still immobilized from rotation relative to the drill housing 10. The chuck jaws 18 are thereupon propelled forward and in advancement toward each other to grip a drill bit positioned manually there between. The torque with which the drill bit is gripped is controlled by the action of the spring washer 60, which will compress and allow the teeth 44 and 46 to be disengaged when the upper limit of torque for chuck jaw advancement is reached.

The embodiment of FIGS. 1-6 represents only one of many numerous alternative clutch mechanisms which operate in accordance with the invention. The important distinction between the clutch mechanism of the present invention and jaw actuator mechanisms in prior art devices is that the clutch mechanism of the present invention moves a clutch interface mechanism into and out of engagement at a mechanical advantage in response to movement of a clutch actuator. Viewed another way, the clutch mechanism gradually draws or eases the chuck jaw propulsion or reciprocating mechanism into and out of engagement with the drill housing or case. The clutch mechanism of the invention may be considered to employ a motion attenuation mechanism interposed between the clutch actuator and the clutch interface to thereby reduce the distance of relative movement between the separate portions of the clutch interface as contrasted with the distance of movement of the clutch actuator.

Figure 7:
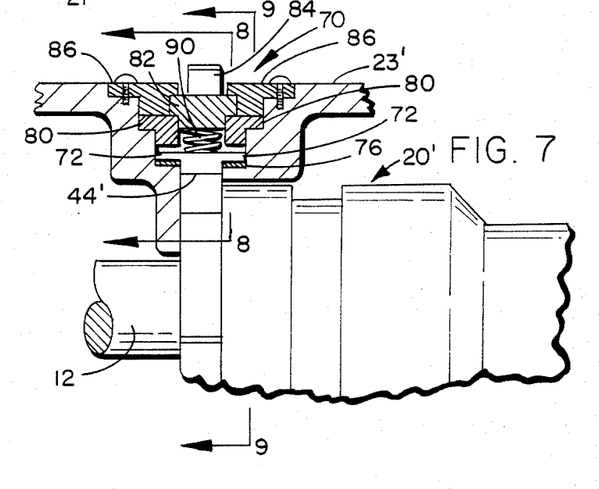
FIG. 7 is a side sectional elevational view of a portion of an alternative embodiment of the invention.
Figure 8:
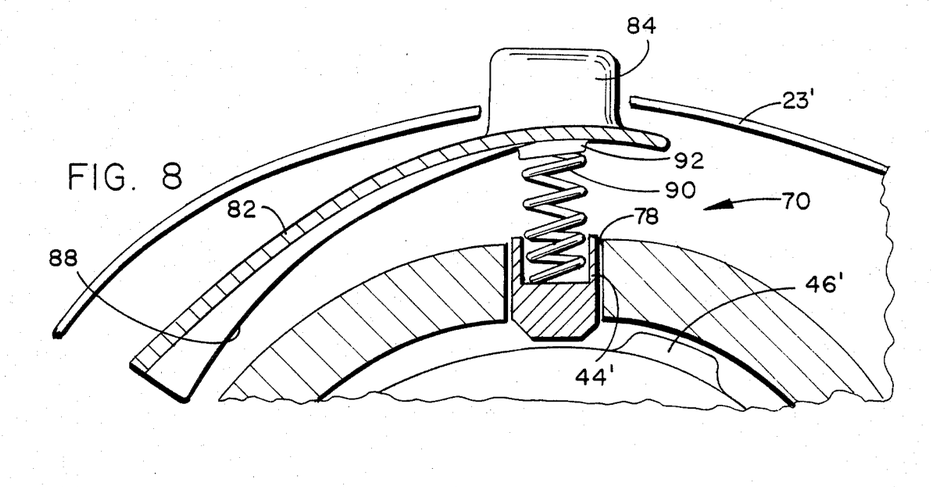
FIG. 8 is a transverse sectional detail taken along the lines 8—8 of FIG. 7.
Figure 9:
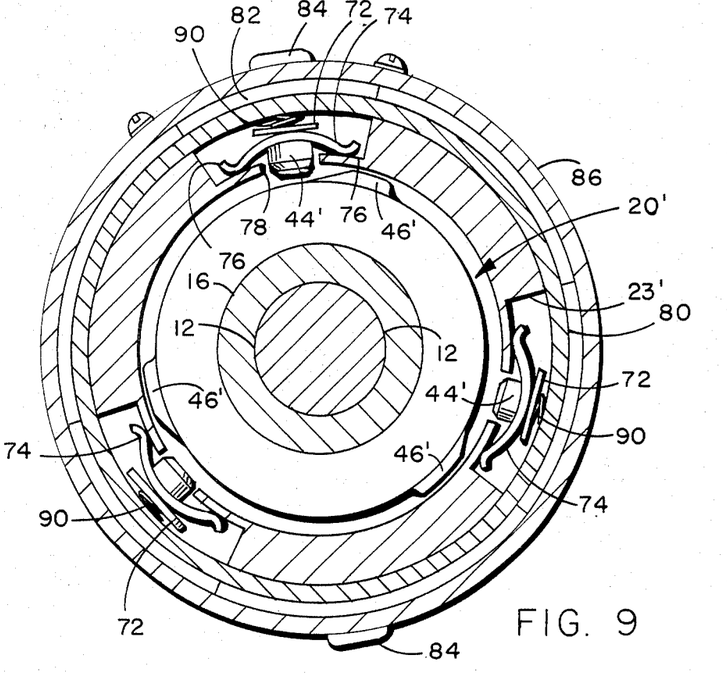
FIG. 9 is a transverse sectional view taken along the lines 9—9 of FIG. 7.

An alternative embodiment of the invention is depicted in FIGS. 7-9. This embodiment differs from the embodiment of FIGS. 1-6 primarily in the construction of the clutch mechanism 70. The clutch jaw propelling mechanism 20' differs from the clutch jaw propelling mechanism 20 only in that the second set of teeth 46' are radially oriented and coaxial relative to the drive shaft 12. The teeth 46', like the teeth 46, rotate with the chuck jaw reciprocating or propelling mechanism.

The first set of teeth 44' in the embodiment of FIGS. 7-9 are radially inwardly directed and have flanges 72 by means of which they are carried. The flanges 72 extend to either side of the teeth 44', both fore and aft in the drill housing nose extension 23' as depicted in FIG. 7. The flanges 72 are supported upon arcuate leaf springs 74 which bear against shoulders 76 defined internally within the structure of the drill housing nose extension 23'. The leaf springs 74 normally bias the first set of teeth 44' out of engagement with the second set of teeth 46'.

The first set of teeth 44' are immobilized from rotation relative to the housing extension 23' by confinement to radially reciprocal movement within slots 78 in the structure in the drill housing nose extension 23'.

The teeth 44' are limited in their outward radial movement by arcuate retaining rings 80, of L-shaped cross section as depicted in FIG. 7, which reside upon arcuate shoulders defined in the structure of the drill housing nose extension 23'.

The teeth 44' are brought into engagement with the teeth 46' by movement of an annular slide ring 82, of generally T-shaped cross-sectional configuration as depicted in FIG. 7. The slide ring 82 has two radially protruding slide buttons 84, adapted for manual manipulation. The slide ring 82 is entrapped for rotational movement within the drill housing nose extension 23' by arcuate retaining brackets 86 which are screwed into the structure of the drill housing nose extension 23'.

The flanges of the slide ring 82 are of uniform thickness and slide in rotation on circular, annular tracks defined between the retaining rings 80 and the retaining brackets 86. The central portion of the retaining ring 82, on the other hand, has an arcuate cam surface 88 which is nearer to the drive shaft 12 at one end than at the other, as is depicted in FIG. 8. A coil spring 90 is disposed in a radial bore in each of the teeth 44'. The outer extremity of the coil spring 90 terminates in a foot pad 92 that slides along the cam surface 88.

The first set of teeth 44' and the second set of teeth 46' form the clutch interface of the clutch mechanism 70 in the embodiment of FIGS. 7-9. The slide ring 82, operable by means of the slide buttons 84 is the clutch actuator. The cam surface 88 on the slide ring 82 forms a cam mechanism to radially reciprocate the teeth 44'. The leaf springs 76 urge the first and second sets of opposing teeth 44' and 46', respectively, apart.

The teeth 44' and 46' can remain disengaged when the slide ring 82 is in the position depicted in FIG. 8. However, when it is desired to engage the cam mechanism and immobilize the chuck jaw propelling mechanism 20' relative to the drill housing 10, the slide ring 82 is moved clockwise, as viewed in FIGS. 8 and 9. The flanges of the slide ring 82 are constrained and move in a circular arc in the track defined between the retaining rings 80 and the retaining brackets 86. The cam surfaces 88 exert increasing force on the teeth 44'. The coil springs 90 are quite stiff, so that they take up only a portion of this increased force. As a result, the bias of the leaf springs 76 is overcome and the teeth 44' are forced radially inwardly to engage the teeth 46'. Once the teeth 44' and 46' are engaged, the chuck jaw propelling mechanism 20' is immobilized from rotation relative to the drill housing 10, and the chuck jaws 18 can be advanced and retracted in the manner previously described. As illustrated in FIGS. 8 and 9 the bearing surfaces of the teeth 46' are not uniform. This is purposeful so as to allow the teeth 44' and 46' to slip past each other at a lower torque limit while advancing the jaws 18 than while retracting them. The coil spring 90 forms the torque limiting device of the embodiment of FIGS. 7-9 and will compress slightly to allow tooth disengagement when an upper torque limit has been reached. Due to the tooth configuration of the teeth 46', the teeth 44' and 46' will slip past each other with less compression of the coil spring 90 during advancement of the jaws 18 as compared with retraction of the jaws 18.

Figure 10:
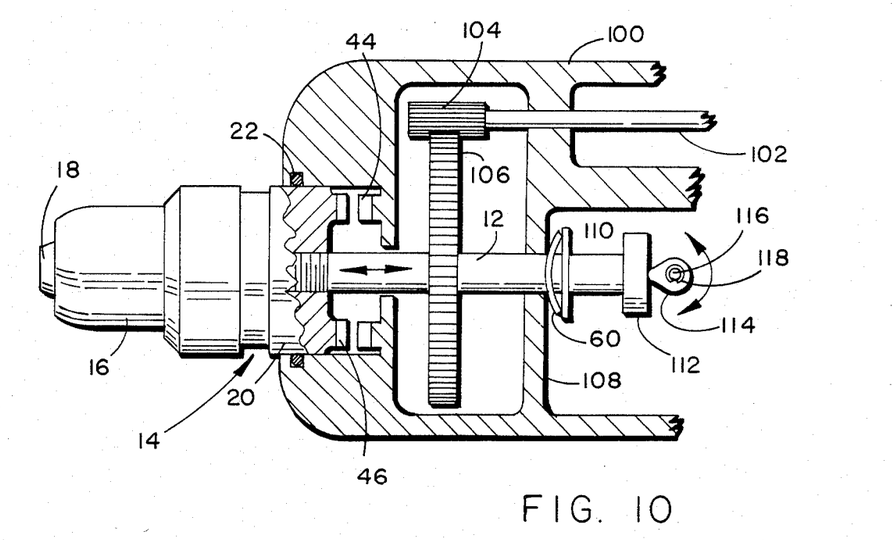
FIG. 10 is a side elevational sectional view of another alternative embodiment of the invention.

Yet another embodiment of the invention is depicted in FIG. 10. In FIG. 10 a drill housing 100 accommodates an O-ring 22 which functions in substantially the same manner as described in connection with the embodiment of FIGS. 1-6. Impact teeth 44 are formed on an internal partition within the structure of the drill housing 100 and function in the same manner as the teeth 44 in the embodiment of FIGS. 1-6.

Within the drill housing 100 the drill motor (not shown) provides a driving output on an output shaft 102 to a pinion 104. The pinion 104 provides power to a main drive gear 106 which is secured to the drive shaft 12.

Behind a transverse partition 108 in the drill housing 100 there is a curved spring washer 60 which bears against the partition 108 and a retaining collar 110 which is clamped into an annular, radial groove in the outer surface of the drive shaft 12. At the butt end of the drive shaft 12 there is a thrust bearing disc 112.

A cam 114 is provided within the drill housing 100 and is mounted upon a transverse mounting shaft 116 which protrudes through the drill housing 100 and terminates in a clutch actuating knob or lever (not shown).

The cam 114 is normally spring biased to the position depicted in FIG. 10. In this position the teeth 44 and 46, disposed coaxially about the drive shaft 12 in facing relationship, are normally biased apart.

In the embodiment of FIG. 10, the drive shaft 12 is axially reciprocal relative to the drill housing 100. The clutch mechanism includes the cam 114 which is operably coupled to axially shift the drive shaft 12. When the cam 114 is rotated from the position depicted in FIG. 10, the spring washer 60 will act upon the retaining collar 110 and force the drive shaft 12 to the right, as viewed in FIG. 10. This will bring the teeth 44 and 46 into mutual engagement, thereby immobilizing the chuck jaw propelling mechanism 20 from rotation relative to the drill housing 100.

The principal difference in operation of the embodiment of FIG. 10 from that of FIGS. 1-6 is that the entire drive shaft 12, carrying with it the chuck mechanism 14, is axially reciprocal a short distance relative to the drill housing 100. The pinion 104 is long enough so that the main drive gear 106 is always engaged therewith despite this axial reciprocation. Functionally, the clutch mechanism depicted in FIG. 10 otherwise operates in essentially the same manner as the clutch mechanisms of the other embodiments of the invention depicted.

Figure 11:
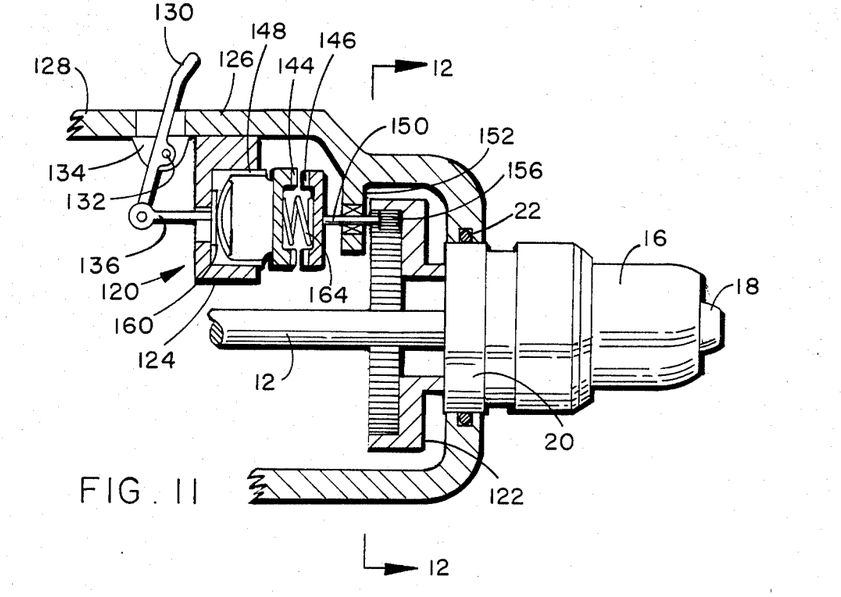
FIG. 11 is a side sectional elevational view of yet another alternative embodiment of the invention.
Figure 12:
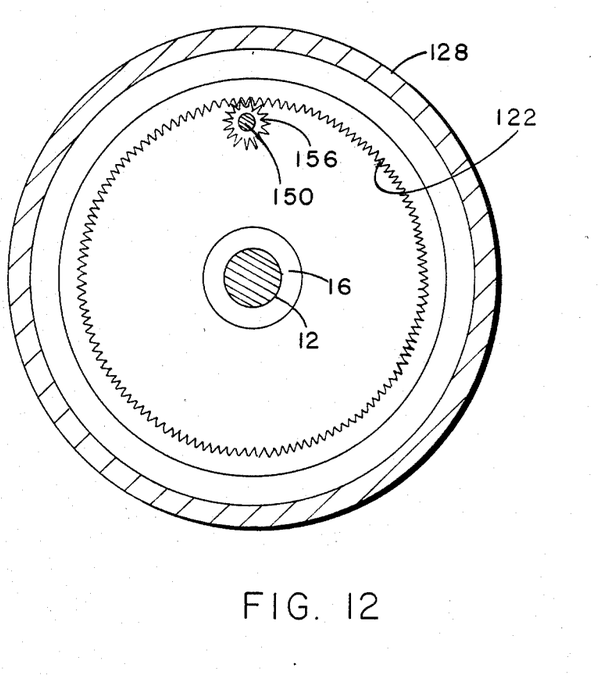
FIG. 12 is a transverse sectional view taken along the lines 12—12 of FIG. 11.

Still another embodiment of the invention is depicted in FIGS. 11 and 12. In this embodiment the chuck jaw propelling mechanism 20 does not terminate at its rearward extremity in any teeth. Rather, the clutch mechanism 120 of the embodiment of FIGS. 11 and 12 is offset from the drive shaft 12. The chuck jaw propelling or reciprocating mechanism 20 has a ring gear 122 at its rearmost extremity. The ring gear 122 is locked for movement with the chuck jaw propelling mechanism 20.

The clutch mechanism 120 includes first and second sets of teeth 144 and 146 which correspond, respectively, to the teeth 44 and 46 of the embodiment of FIGS. 1-6. Likewise, a corresponding biasing coil spring 164 urges the teeth 144 and 146 apart. The teeth 144 are carried on an impact tooth carrier 148. The impact tooth carrier 148 has radial crenelations which interengage corresponding crenelations in a clutch mounting block 124. The clutch mounting block 124 is secured by screws 126 to the drill housing 128. A spring washer 160 is located within the clutch mounting 124 and performs the same function as the spring washer 60 in the embodiment of FIGS. 1-6. A clutch actuating lever 130 is hinged at a fulcrum 132 between internal mounting brackets 134 within the drill housing 128. The end of the clutch actuating lever 130 within the drill housing 128 is hinged to a reciprocating rod 136 which is used to reciprocate the impact tooth carrier 148.

The impact or blocking teeth 146 are carried on a rod 150 which is journaled for rotation in a transverse mounting flange 152 within the housing 128. At the opposite end of the mounting rod 150 there is a pinion 156 which is engaged with the ring gear 122.

In the operation of the embodiment of FIG. 12 the coil spring 164 normally biases the clutch interface teeth 144 and 146 apart. The chuck jaw propelling mechanism 20 is thereby able to turn with the jaw guide 16, subject to the light drag exerted by the O-ring 22 in the manner previously described. The pinion 156 rotates in a free wheeling condition with the ring gear 122.

When the clutch actuating lever 134 is rotated counterclockwise, as viewed in FIG. 11, the clutch interface teeth 144 and 146 are brought into engagement. Since the impact tooth carrier 148 is immobilized from rotation relative to the drill housing 128, engagement of the teeth 144 and 146 also immobilizes the pinion 156 from engagement relative to the drill housing 128. The pinion 156 thereupon locks the ring gear 122, thereby preventing rotation of the chuck jaw propelling mechanism 20.

It can be seen that the structure and function of the clutch mechanism 120 of the embodiment of FIGS. 11 and 12 is quite similar to the structure and function of the clutch mechanism 21 in the embodiment of the invention depicted in FIGS. 1–6. The principal difference is that since the clutch mechanism 120 is removed from the drive line of the drill, it does not have to withstand the large forces developed along the drive line of the drill. A much lighter duty, lighter weight and less expensive clutch can thereby be employed.

Undoubtedly, numerous other mechanical and electrical expedients beyond the embodiments described herein will become readily evident to those famliar with reversible power tools. For example, a clutch mechanism employing a shift collar and synchro rings could be employed. Furthermore, clutch actuation could be through a microswitch or other electrical system. Accordingly, the scope of the invention should not be construed as limited to the specific embodiments disclosed herein, but rather as defined in the claims appended hereto.

I claim:

1. In a reversible drill having a rotary drive shaft carried by a drill housing and having a chuck engageable for rotation with said drive shaft and formed with a jaw guide, chuck jaws constrained by said jaw guide for radial advancement and retraction relative to the axis of said drive shaft, chuck jaw reciprocating means journaled relative to said jaw guide, and coupled to said chuck jaws to selectively advance and retract said chuck jaws when said chuck jaw reciprocating means and said jaw guide are subjected to relative rotation in opposite directions, and manually actuatable clutch means for engaging and disengaging said chuck jaw reciprocating means relative to said drill housing to respectively prevent and allow relative rotation between said jaw guide and said chuck jaw reciprocating means, the improvement wherein said clutch means includes a clutch actuator mounted for movement relative to said drill housing, and including a bearing collar disposed coaxially about said drive shaft and riding on a spiral track secured relative to said drill housing and a radial lever arm operated from externally of said drill housing and connected to said bearing collar, clutch interface means for engaging said drill housing to said chuck jaw reciprocating means and including first and second sets of opposing teeth disposed about a common axis and about said drive shaft in facing relationship, longitudinally reciprocal means for bringing said first and second sets of teeth into and out of engagement, means for immobilizing said first set of teeth from rotation relative to said drill housing, means coupling said second set of teeth to rotate with said chuck jaw reciprocating means, biasing means urging said first and second sets of teeth apart and urging said first set of teeth to drive bearing collar toward one end of said spiral track, coupling means for moving said clutch interface means into engagement at a mechanical advantage in response to movement of said clutch actuator, wherein said lever means is coupled to said bearing collar and operable from externally of said drill housing to totate said bearing collar and overcome said biasing means to advance said bearing collar toward the opposite end of said spiral track, thereby forcing said first and second sets of teeth into mutual interengagement.

2. A reversible drill according to claim 1 further comprising torque limiting means interposed between said bearing collar and said first set of teeth.

3. In a reversible drill having a rotary drive shaft mounted in a drill housing and having a chuck engageable for rotation with said drive shaft and formed with a jaw guide, chuck jaws constrained by said jaw guides for radial advancement and retraction relative to the axis of said drive shaft, chuck jaws reciprocating means journaled relative to said jaw guide, and coupled to said chuck jaws to selectively advance and retract said chuck jaws when said chuck jaw reciprocating means and said chuck jaw guide are subjected to relative rotation in opposite directions, and manually actuatable clutch means for engaging and disengaging said chuck jaw reciprocating means relative to said drill housing to respectively prevent and allow relative rotation between said chuck jaw reciprocating means and said jaw guide, wherein said manually actuatable clutch means is arranged to apply a greater force to engage said drill housing and said chuck jaw reciprocating means together upon rotation of said drive shaft in one direction then upon rotation of said drive shaft in the opposite direction, the improvement comprising means interposed between said drill housing and said chuck jaw reciprocating means to exert a light drag tending to retard rotation of said chuck jaw reciprocating means.

4. A drill adapted to receive interchangeable bits comprising a reversible motor mounted in a drill housing and having a rotary drive shaft, a chuck mounted upon said drive shaft, said chuck being formed with a jaw guide, chuck jaws constrained by said jaw guide for radial advancement and retraction relative to the axis of said drive shaft to grip and release a drill bit, chuck jaw propelling means journaled relative to said jaw guide, and coupled to said chuck jaws to selectively advance and retract said chuck jaws when said chuck jaw propelling means and said jaw guide are subjected to relative rotation in opposite directions, and manually actuatable clutch means for moving said chuck jaw propelling means into and out of engagement with said case to respectively restrain and release said chuck jaw propelling means from rotation relative to said case, and a resilient O-ring interposed between said drill housing and said chuck jaw propelling means to exert a light drag retarding rotation of said chuck jaw propelling means.

5. In a power tool for receiving interchangeable work pieces and having a reversible motor with a rotary drive shaft mounted in a case and having a chuck mounted upon said drive shaft and formed with a jaw guide, chuck jaws constrained by said jaw guide for radial advancement and withdrawal relative to the axis of said drive shaft, and chuck jaw propulsion means journaled for rotation relative to said jaw guide, and coupled to said chuck jaws selectively advance and withdraw said chuck jaws to, respectively, grip and release a work piece, when said chuck jaw propulsion means and said jaw guide are subjected to relative rotation in opposite directions, and longitudinally movable clutch means for selectively engaging and disengaging said chuck jaw propulsion means relative to said case to respectively prevent and allow rotation of said chuck jaw propulsion means relative to said case, and means interposed between said case and said chuck jaw propulsion means to exert a light drag tending to retard rotation of said chuck jaw propelling means relative to said case.

6. In a reversible drill having a rotary drive shaft carried by a drill housing and having a chuck engageable for rotation with said drive shaft and formed with a jaw guide, chuck jaws constrained by said jaw guide for radial advancement and retracting relative to the axis of said drive shaft, chuck jaw reciprocating means journaled relative to said jaw guide, and coupled to said chuck jaws to selectively advance and retract said chuck jaws when said chuck jaws reciprocating means and said jaw guide are subjected to relative rotation in opposite directions, and manually actuatable clutch means for engaging and disengaging said chuck jaw reciprocating means relative to said drill housing to respectively prevent and allow relative rotation between said jaw guide and said chuck jaw reciprocating means including first sets of mutually engageable clutch teeth disposed about a common axis wherein said first set of clutch teeth projects toward said chuck jaw reciprocating means and is immobilized from rotation by said housing and said second set of clutch teeth faces and projects toward said first set of clutch teeth and is secured to said chuck jaw reciprocating means to move in rotation therewith, biasing means urging said clutch teeth into disengagement, and means interposed between said drill housing and said chuck jaw reciprocating means to exert a drag retarding rotation of said chuck jaw reciprocating means.

* * * * *